US006793875B1

(12) United States Patent
Shaw et al.

(10) Patent No.: US 6,793,875 B1
(45) Date of Patent: Sep. 21, 2004

(54) NANOSTRUCTURED CARBIDE CERMET POWDERS BY HIGH ENERGY BALL MILLING

(75) Inventors: Leon L. Shaw, Storrs, CT (US); Ruiming Ren, Storrs, CT (US); Zhenguo Yang, Storrs, CT (US)

(73) Assignee: The University of Connecticut, Storrs, CT (US)

( * ) Notice: Subject to any disclaimer, the term of this patent is extended or adjusted under 35 U.S.C. 154(b) by 0 days.

(21) Appl. No.: 09/652,513

(22) Filed: Aug. 31, 2000

Related U.S. Application Data

(63) Continuation-in-part of application No. 08/936,868, filed on Sep. 24, 1997, now Pat. No. 6,214,309.
(60) Provisional application No. 60/152,497, filed on Sep. 2, 1999.

(51) Int. Cl.$^7$ .............................................. C22C 32/00
(52) U.S. Cl. ........................... 419/18; 423/440; 75/240; 419/17
(58) Field of Search ................................ 423/439, 440; 419/32, 17, 18, 14, 33; 148/513

(56) References Cited

U.S. PATENT DOCUMENTS

| | | | |
|---|---|---|---|
| 3,865,586 A | * | 2/1975 | Volin et al. .................... 75/203 |
| 3,937,792 A | | 2/1976 | Lumby ........................ 423/344 |
| 4,017,319 A | | 4/1977 | Greskovich et al. .......... 106/55 |
| 4,127,630 A | | 11/1978 | Washburn ..................... 264/65 |
| 4,285,895 A | | 8/1981 | Mangels et al. ............... 264/65 |
| 4,351,787 A | | 9/1982 | Martinengo et al. .......... 264/65 |
| 4,356,136 A | | 10/1982 | Mangels ....................... 264/65 |
| 4,377,542 A | | 3/1983 | Mangels et al. ............... 264/65 |
| 4,428,916 A | | 1/1984 | Komeya et al. ............. 423/344 |
| 4,552,740 A | | 11/1985 | Morgan et al. .............. 423/344 |
| 4,623,498 A | | 11/1986 | Beckwith et al. .............. 264/65 |
| 4,687,655 A | | 8/1987 | Hunold et al. .............. 423/344 |
| 4,784,839 A | | 11/1988 | Bachelard et al. |
| 4,851,203 A | | 7/1989 | Bachelard et al. |
| 4,891,341 A | | 1/1990 | Cutler et al. |
| 5,037,626 A | | 8/1991 | Ho et al. |
| 5,160,719 A | | 11/1992 | Edler ........................ 423/344 |
| 5,187,129 A | | 2/1993 | Edler et al. .................... 501/97 |
| 5,190,737 A | | 3/1993 | Weimer et al. |
| 5,230,729 A | | 7/1993 | McCandlish et al. ......... 75/351 |
| 5,275,985 A | | 1/1994 | Huang ......................... 501/97 |
| 5,338,523 A | | 8/1994 | Krstic |
| 5,340,417 A | | 8/1994 | Weimer et al. |
| 5,344,634 A | | 9/1994 | Edler ........................ 423/344 |
| 5,405,592 A | | 4/1995 | Edler et al. ................. 423/344 |
| 5,417,952 A | | 5/1995 | Koc et al. |
| 5,523,269 A | | 6/1996 | Morgan et al. |
| 5,525,556 A | | 6/1996 | Dunmead et al. |
| 5,538,675 A | | 7/1996 | Dunmead et al. |
| 5,746,803 A | * | 5/1998 | Dunmead et al. ............. 75/351 |

FOREIGN PATENT DOCUMENTS

GB      811906      4/1959

OTHER PUBLICATIONS

Shaw, et al. "A Novel Process for Synthesizing Nanostructured WC/Co Powders" Powder Metallurgy Alloys and Particulate Materials for Industrial Applications, D.E. Alman and J.W. Newkirk, Eds., A Publication of TMS, pp. 75–80, 2000.

Ban, et al. "On the Reaction Sequence of WC–Co Formation Using an Intergrated Mechanical and Thermal Activation Process", Acta mater. 49 (2001) 2933–2939.

Shaw, Leon L., "Processing of Nanostructured Carbides, Nitrides, and Their Composites", Advanced Engineering Materials, Aenmfy, vol. 2, No. 11, Nov. 2000, pp. 721–723.

Shaw, Leon L., "Material Processing Via An Intergrated Mechanical and Thermal Activation Process", Materials and Manufacturing Processes, 16(3), 405–418 (2001).

Ren, et al., "Synthesis of Nanostructured Silicon Carbide through an Integrated Mechanical and Thermal Activation Process", J. Am. Ceram. Soc., 85 (4) 819–27–(2002).

Shaw, et al., "Dependence of Silicon Carbide Product Morphology on the Degree of Mechanical Activation" J. Am. Ceram. Soc., 85 (3) 709–11 (2002).

Shaw, et al., "Mechanically Enhanced Reactivity of Silicon for the Formation of Silicon Nitride Composites" J. Am. Ceram. Soc., 81 (3) 760–64, (1999).

Don Bray, "22nd Annual Conference on Composites, Advanced Ceramics, Materials, and Structures: B" Ceramic Engineering & Science Proceedings, vol. 19. Issue 4, 1998 pp. 461–469.

B.H. Kear and L.E. McCandish, "Chemical Processing and Properties of Nanostructured WC–Co Materials," Nanostruct. Mater., 3, 19–30 (1993).

P. Schwarzkopf and R. Kieffer, *Refractory Hard Metals*, The Macmillan Company, New York, 1953, pp. 138–161.

Jack, *Engineering, Applications of Organic Materials*, 148–153, 1984.

(List continued on next page.)

*Primary Examiner*—Stuart Hendrickson
(74) *Attorney, Agent, or Firm*—Cantor Colburn LLP

(57) ABSTRACT

A method for the synthesis of method for the manufacture of carbide cermet powders, comprises high energy ball milling a mixture of precursor powders and a carbon source, followed by annealing the milled powder mixture. The precursor powders are selected from materials suitable for the formation of cermets, for example silicon, titanium, thorium, hafnium, vanadium, chromium, tungsten, tantalum, niobium, and zirconium-containing materials. The precursors further include a source of carbon. Tungsten cobalt carbide powders produced by this method are submicronsized (0.2 to 0.4 microns) with internal nanograins (10 to 40 nanometers in diameter).

27 Claims, 3 Drawing Sheets

OTHER PUBLICATIONS

Shaw, et al. "Synthesis of nanostructured Si3N4/SIC composite powders through high energy reaction milling" Materials Science & Engineering. A244 (1998) 113–126.

Ren, et al. "Synthesis of Nanostructured TiC via Carbothermic Reduction Enhanced by Mechanical Activation", Scripta Materialia, vol. 38. No. 5. pp. 735–741. 1998.

N.C. Angastiniotis, et al. "Formation and Alloying of Nanostructured $\mu$–W Powders", NanoStructured Materials. vol. 1 pp. 293–302, 1992.

Zhu, et al. "A New Route for the Synthesis of Tungsten Carbide–Cobalt Nanocomposites" J. Am. Ceram. Soc. 77 (10) 2777–2778 (1994).

Gao, et al. "Low Temperature Carburization of High Surface Area Tungsten Powders" NanoStructured Materials, vol. 5, pp. 555–569 (1995).

S. Mi and T.H. Courtney, "Synthesis of WC and WC–Co Cermets by Mechanical Alloying and Subsequent Hot Isostatic Pressing" Scripta Materialia, vol. 38, No. 1. pp. 171–176, 1998.

L. Gao and B.H. Kear, "Synthesis of Nanophase WC Powder by a Displacement Reaction Process," Nanostruct. Mater., 9, 205–208 (1997).

M.S. El–Eskandarany, M. Omori, M. Ishikuro, T.J. Konno, K. Takada, K. Sumiyama, T. Hirai and K. Suzuki, "Synthesis of Full–Density Nanocrystalline Tungsten Carbide by Reduction of Tungstic Oxide at Room Temperature," Metall. Mater. Trans., 27A (12) 4210–4213 (1996).

H. Mossan, "Preparation au Four Electrique de Quelques Metaux Refractaires: Tungstene, Molybdene, Vanadium", Compt. Rend., 116, 1225–1227 (1893).

P. Williams, "Sur la Preparation et les Propietes d'un Nouveau Carbure de Tungstene", Comt. Rend., 126, 1722 (1898).

N. Pring and W. Fielding, "The Preparation at High Temperatures of some Refractory Metal s from their Chlorides", J. Chem. Soc., 95, 1497–1507 (1909).

I. E. Campbell, C.F. Powell, D.H. Nowicki and B.W Gonser, "The Vapor Phase Deposition of Refractory Materials", J. Electrochem. Soc., 96, 318 (1949).

L. Andrieux and G. Weiss, "Preparation des Composes du Molybdene et de Tungstene par Electrolyse Ignee", Bull. Soc. Chim. France, 15, 598 (1948).

P. Seegopaul, L.E. McCandlish and F.M. Shinneman "Production Capability and Powder Processing Methods for Nanostructured WC–Co Powder", Int. J. of Refractory Metals $ Hard Materials 15 (1997) 133–138.

M. Sherif El–Eskandarany, "Mechanical solid state reaction for synthesis of $\beta$–SIC powders", J. Mater. Res, vol. 10, No. 3, Mar. 1995, pp. 659–667.

L. Lu and M. O. Lai, Mechanical Alloying pp. 11–21.

* cited by examiner

NANOSTRUCTURED CARBIDE CERMET POWDERS BY HIGH ENERGY BALL MILLING

CROSS-REFERENCE TO RELATED APPLICATIONS

This application claim priority to U.S. application Ser. No. 60/152,497, filed Sep. 2, 1999, and is a continuation-in-part to U.S. application Ser. No. 08/936,868, filed Sep. 24, 1997, now U.S. Pat. No. 6,214,309 B1 both of which are fully incorporated herein by reference.

BACKGROUND OF THE INVENTION

1. Field of the Invention

This invention relates to carbide powders. In particular, this invention relates to a method for synthesizing micron- and submicron-sized, high purity, high surface area, cermet carbide powders from oxides using a high energy milling step.

2. Brief Description of the Related Art

Micron-, submicron-, and nanosized carbide powders are important materials for engineering applications. As used herein, "micron-sized" powders refers to powder particles wherein the mean particle size is equal to or greater than about 1.0 microns. "Submicron-sized" powders refers to powder particles wherein the mean particle size is in the range from about 0.1 to about 1.0 microns. "Nanosized" powders refers to powder particles wherein the mean particle size is less than about 0.1 micron (about 100 nm). In certain instances, micron- and and submicron-sized particles comprise many nanosized crystalline grains rather than a single, large grain. In these cases, the particles are referred to as "micron- and/or submicron-sized particles with nano-structures" or "micron- and/or submicron-sized, nanostructured particles." Nanosized and micron- and/or submicron-sized, nanostructured particles have a high fraction of atoms located at the grain boundaries of the particle. Such materials accordingly have different, and often advantageous properties compared to conventional particles having the same chemical compositions.

Currently, the primary process for the production of micron- and submicron-sized carbide powders is high-temperature, carbothermic reduction of the corresponding oxides by carbon powders. For example, most industrial silicon carbide (SiC) powders are manufactured via the Acheson process through carbothermic reduction of silicon dioxide ($SiO_2$) by carbon powder at temperatures up to 2000 to 2300° C. for 30 hours. A carbothermic method based on reduction of one or more metal oxides reacted with a binder material and a source of carbon is disclosed in U.S. Pat. No. 4,784,839 to Bachelard et al. Similarly, as described in UK Patent No. 811,906 (issued in 1959), industrial titanium carbide (TiC) powders are produced through reduction of titanium dioxide ($TiO_2$) by carbon at temperatures ranging from 1700 to 2100° C. for 10 to 20 hours.

Advantages of using high-temperature carbothermic reduction for the production of carbides include low cost of the oxide raw materials, and ease in scale-up for tonnage-level production. However, the final products have a wide range of particle sizes, and moreover are normally larger than one micron, due to high reaction temperatures and long reaction times. Milling after carbothermic reduction is required. Undesirable inhomogeneities are also frequently found in the stationary reaction mix. These inhomogeneities are due to diffusion gradients established during the reduction reaction, and require extensive milling and purification procedures in order to convert the as-synthesized products into high quality, sinterable powders. The SiC powder produced by the Acheson process, for example, has a large grain size and is contaminated with oxygen. Accordingly, there remains a need in the art for methods whereby homogenous carbide powders may be produced having a controlled and uniform size, without extensive milling and purification procedures.

Cermet materials area of particular industrial interest. Tungsten cobalt carbide (WC—Co), for example, is a well known carbide cermet, having been widely used in aluminum, titanium, steel, aerospace, automobile, electronics, oil and wood industries, and in military applications as metal-cutting tools, wire drawing dies, cold and hot rolls, punches and dies for blanking and extrusion, bearing, micro-twist drills for printed circuit boards and printer heads, complex components for aero engine fuel systems, rock-drilling bits, oil well drills, large valves for controlling sludge in the oil industry, slip gauges, compacting tools, measuring devices, fan blade and mixer blade cladding, hardfacings for a variety of wear components, tire studs, armor-piercing projectiles, and other applications.

Currently, nanostructured WC—Co cermet powder is commercially manufactured by the above-described conventional industrial process, or by spray conversion processing. Spray conversion processing consists of (i) preparation and mixing of aqueous solutions of the precursor compound ($CoCl_2$ as cobalt source and $H_2WO_4$ and $(NH_3)WO_4$ as tungsten source); (ii) spray drying the aqueous solution to form a chemically homogeneous precursor powder, and (iii) thermochemical conversion of the precursor powder to the nanostructured end-product powder. The thermochemical conversion is conducted in a fluidized bed reactor at 700 to 900° C. in a $Co/CO_2$ atmosphere. The WC—Co powder produced is in the form of hollow, porous spheres 10–40 microns in diameter, comprising internal nanosized grains less than about 50 nm in diameter. There accordingly remains a need in the art for economical method for the manufacture of high quality, high surface area cermet materials such as tungsten cobalt carbide.

SUMMARY OF THE INVENTION

The above-described drawbacks and deficiencies of the prior art are alleviated by a method for the manufacture of high purity, high surface area, carbide cermet powders, comprising high energy ball milling a mixture of precursor powders, followed by annealing the milled powder mixture. The precursor powders are selected from materials suitable for the formation of cermets, for example silicon, titanium, thorium, hafnium, vanadium, chromium, tungsten, tantalum, niobium, and zirconium-containing materials. The precursors further include a source of carbon. Tungsten cobalt carbide powders produced by this method are submicron-sized (0.2 to 0.4 microns) with internal nanograins (10 to 40 nanometers in diameter). The synthesized powders may also include other nanophases such as TiC, VC, TaC, NbC, and the like. These nanostructured WC—Co powders produced in accordance with this method have furthermore been shown to produce components with much better wear resistance than those made of conventional WC—Co powders.

Preferably, carbon monoxide is removed from the reaction chamber during heating in order to drive the reaction to completion at low temperatures and/or short times. The high energy milling step serves to mix the oxide and carbon on a nanosized scale and to increase the reactivity of the reactants by increasing surface area, introducing structural defects and internal strains, and transforming the crystalline materials to an amorphous state. The method produces high purity, high surface area, micron- or submicron-sized carbide powders having a narrow particle size distribution and internal nanostructure. The method is conducted at low temperatures, for short processing times, and thus significantly lowers cost.

The above discussed and other features and advantages of the present invention will be appreciated and understood by those skilled in the art from the following detailed description and drawings.

DETAILED DESCRIPTION OF THE INVENTION

Figure 1:
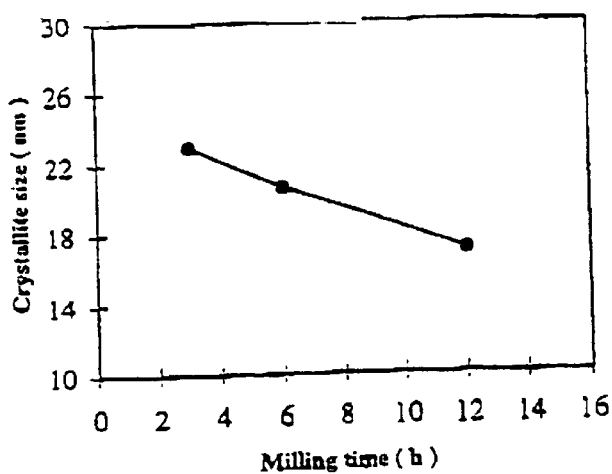
FIG. 1 is a graph showing the inverse relationship between milling time and crystallite size.

In one embodiment of the present method, metal carbide powders are manufactured by first, high energy milling of selected oxide powders with carbon powder at ambient temperature for about 2 to 48 hours; and second, annealing the milled powders to produce the corresponding carbides. Heating the milled powder mixture at a temperature between 500 and 1500° C. for about one to two hours produces submicron-sized, nanostructured powders, while heating at a higher temperatures (about 1500 to about 1800° C.) will lead to grain growth and produce micron-sized powders. During heating, subatmospheric pressure or a flowing argon atmosphere is preferably maintained, thereby removing carbon monoxide gas from the reaction chamber and driving the reaction to completion. The high purity carbide powders thus produced comprise homogenous particles with a narrow particle size distribution.

The overall stoichiometric reaction for the method in accordance can be expressed generally as:

$$M_xO_y + (z+y)C = M_zC_z + yCO \quad (1)$$

wherein M represents the metal element, and x, y and z are constants. Thus, for the synthesis of SiC, equation (1) becomes:

Synthesis of TiC is:

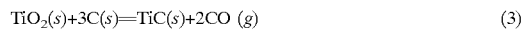

Synthesis of $Cr_3C_2$ is shown in equation (4):

Carbides amenable to synthesis using the method of the present invention include, but are not limited to, those based on silicon, titanium, thorium, hafnium, vanadium, chromium, tungsten, tantalum, niobium, zirconium, and the like, for example, SiC, TiC, VC, HfC, $ThC_2$, ThC, $Cr_3C_2$ WC, $W_2C$, ZrC, TaC, $Ta_2C$, and NbC. Carbide composite powders (of two or more carbides) may also be formed by high energy milling of the corresponding metal oxides and carbon. Adjustment of the molar ratio of the starting oxides leads to composite powders having each of the carbides at a given volume fraction.

The first step requires high energy milling, i.e., ball milling, of selected oxide powders with a source of carbon for 2 to 48 hours at ambient temperature. The ball milling is preferably conducted in an inert atmosphere (e.g., an argon gas atmosphere) using methods and equipment known in the art, such as an attritor, vibratory mill, or horizontal ball mill. Use of attritors and horizontal ball mills are preferable for tonnage-level production. The carbon source could be graphite, coal, , thermal black, acetylene black, coke, or combinations thereof, or other sources known in the art, depending on the required purity of the final products. The milling step is important in that it reduces all powder particles to submicron size, transforms most of the powders to an amorphous state, and provides a uniform mixing of carbon with oxides on a nanometer scale. Either wet or dry ball milling may be used. The liquid used for wet milling is preferably inert under the milling conditions, for example a hydrocarbon solvent such as heptane.

The key parameters for optimizing synthesis of high purity carbides during milling include the ratio of the ball-to-powder weight (referred to herein as the charge ratio); the milling time; the composition and purity of the starting materials; the cooling conditions during milling; and the milling speed. The crystallite size of the as-milled powder mixture decreases with increasing milling time and increase with increasing the molar ratio of carbon:metal oxide. Reduction of the crystallite size of the as-milled powder in turn enhances the formation kinetics of the carbides during the annealing step. Thus, where annealing time and temperature are held constant, an increase in milling time results in finer crystallite sizes and more uniform mixing, thereby resulting in an increase in the amount of formed SiC.

The milled powders are next annealed, that is, heated at a specified temperature. Heating in the range from between about 500° C. to about 1500° C. results in the formation of submicron-sized, nanostructured carbides. Heating in the range from about 1500° C. to about 1800° C. results in the formation of micron-sized particles.

Annealing is preferably conducted under a flow of inert gas i.e., argon, or at reduced pressure, preferably at less than 1000 millimeters. Either of these conditions will result in the removal of carbon monoxide gas from the reaction chamber, thereby driving the reaction to completion in about 1 to 2 hours. The reduced pressure should not be so low as to draw off either the reactants or the product. An acceptable minimum pressure depends on the form of reactants during the heating process, i.e., loose powder form or cold compacted (see Examples below).

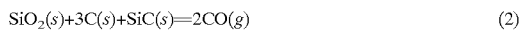

The key parameters during annealing include the annealing temperature, the holding time, and the annealing atmospheric pressure. The formation of carbides is enhanced with use of higher annealing temperatures and longer annealing times.

The above-described method has a number of advantages over prior art methods. For example, milling after the carbothermic reduction is eliminated. Powder handling, including loading and removal from the canister and the furnace, are carried out in air, which substantially decreases costs as compared to processes requiring powder handling under an inert atmosphere.

The purity of the products is also increased. Although the XRD patterns of the annealed powders indicate the presence of both tungsten carbide and MC (M being a metal) in the final products, these contaminants derive from wear of the tungsten carbide balls and the wall of the canister used during high energy milling. Tungsten carbide contamination is prevented by using balls made of the carbide identical to that being synthesized, for example, SiC balls used for production of SiC powders and TiC balls for production of TiC powders. Both of these balls are commercially available. The MC contamination is prevented by use of carbide canisters or carbide-lined canister. Furthermore, a short milling time could be employed to prevent the contamination, as in the following examples that only use 1.5-hour milling times.

In another embodiment, high purity, high surface area carbide cermet powders may be provided by a method comprising high energy ball milling a mixture of precursor powders, followed by annealing the milled powder mixture. The precursor powders are selected from materials suitable for the formation of cermets, for example silicon, titanium, thorium, hafnium, vanadium, chromium, tungsten, tantalum, niobium, and zirconium-containing materials. Exemplary carbides thus include WC, TiC, TaC, NbC and $Cr_3C_2$, and combinations of the foregoing carbides. Exemplary metals include cobalt and nickel-chromium alloys, or a combination thereof.

Suitable precursor materials include but are not limited to the oxides and elemental forms of the materials for example tungsten, tungsten oxide, cobalt, cobalt oxide, titanium, titanium oxide, nickel, nickel oxide, and the like. The mixture of precursors further includes a source of carbon as described above.

Again, the carbide cermet powders are manufactured by high energy milling a mixture of precursors (e.g., $WO_3$ and CoO for making WC—Co cermets) with a carbon source for 2 to 24 hours, preferably at ambient temperature. The milling is conducted in an inert atmosphere (e.g., an argon gas atmosphere) or air using an attritor, vibratory mill, or horizontal ball mill. Attritors and horizontal ball mills are preferable for tonnage production. High energy milling reduces all powder particles to submicron (0.1 to less than 1.0 micron) or nanometer (10 to less than 100 nm) sizes, transforms some of the powders to an amorphous state, and provides a uniform mixing of carbon with oxides on nanometer scales. Either wet or dry ball milling may be used. The liquid used for wet milling is preferably inert under the milling conditions, for example a hydrocarbon solvent such as heptane. The key parameters of the milling step for synthesizing high purity, nanostructured cermets are the charge ratio, the milling time, the composition of the starting powder mixture, the cooling condition during milling, and the milling speed.

The milled powder mixture is annealed at a temperature between about 500 to about 1500° C. to form the cermet carbide powder. The key parameters during annealing are the atmosphere, the holding time, and the temperature. For tungsten cobalt carbide powders, for example, the annealing temperature is preferably between about 700 and about 1300° C. for 1 to 2 hours to form nanostructured cermet WC—Co powders. The heating process is conducted in an atmosphere comprising argon (Ar), carbon monoxide (CO), hydrogen ($H_2$) or combinations thereof. Powder handling, including loading and removal from the canister and the furnace, is carried out in air; it does not require an inert atmosphere, which would substantially increase the cost of the process. The cermet powder so-produced is submicron-sized (0.2 to 0.4 microns) with internal nanograins of 10 to 40 nm in diameter (see Examples 3 to 6).

Figure 2:
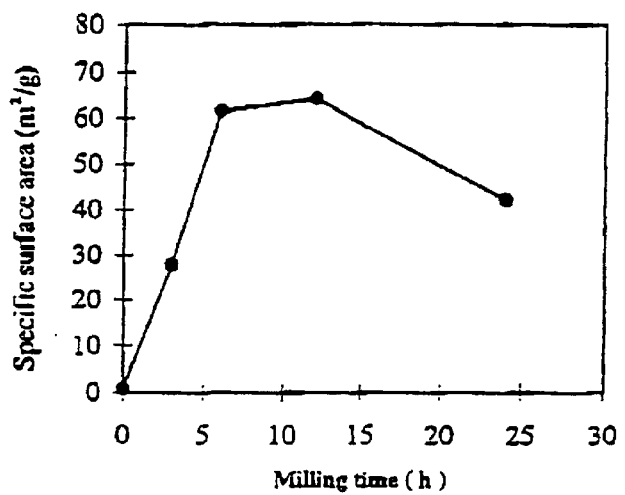
FIG. 2 is a graph showing the relationship between milling time and specific surface area.
Figure 3:
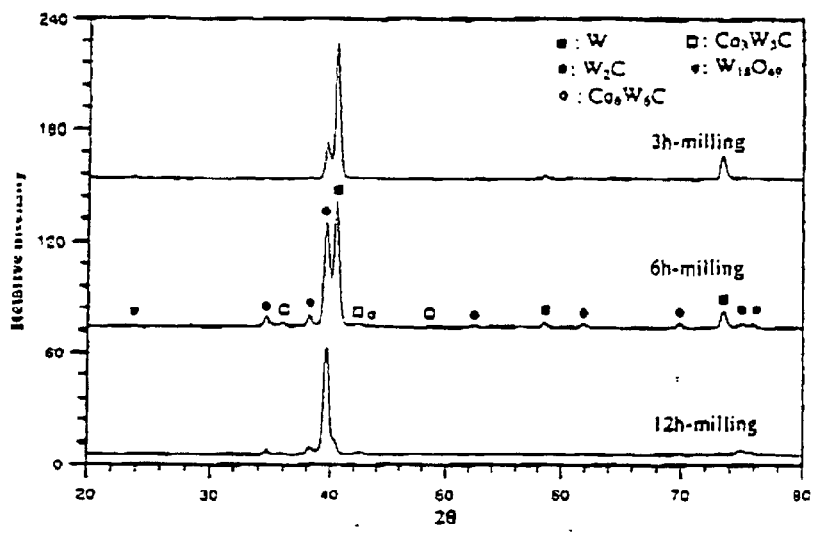
FIG. 3 shows the XRD patterns of $WO_3$—CoO—C powder milled for varying times and then annealed at 800° C. for 2 hours under argon.
Figure 4:
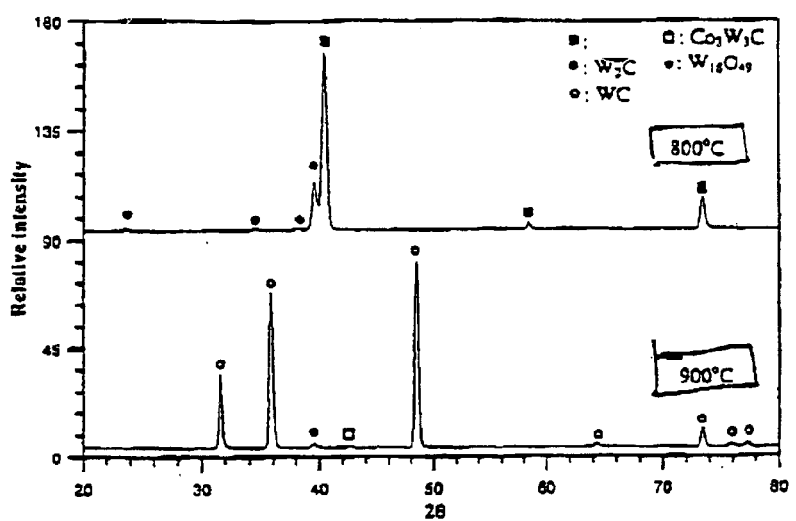
FIG. 4 shows changes in the XRD patterns of $WO_3$ and graphite powder milled for three hours at 800° C. and 900° C.

It has been established that the crystallite size of the as-milled powder mixture decreases with increasing the charge ratio, the milling time (FIG. 1), the molar ratio of the oxide to carbon, and the milling speed. The specific surface area (SSA) of the milled powder increases with milling time at first, and then decreases after about 12 hours of milling; furthermore, the SSA of the milled powder is always higher than that of the starting powder mixture (FIG. 2). Reducing the particle size, increasing the specific surface area, and achieving the uniform mixing between the oxide and carbon through high energy milling have enhanced carbothermic reduction to form tungsten and tungsten carbides. As shown in FIG. 3, conversion of $WO_3$ to W and then W to $W_2C$ increases with increasing milling time. The kinetics of WC formation are also strongly dependent on the temperature of carbothermic reduction, as shown in FIG. 4.

Figure 5:
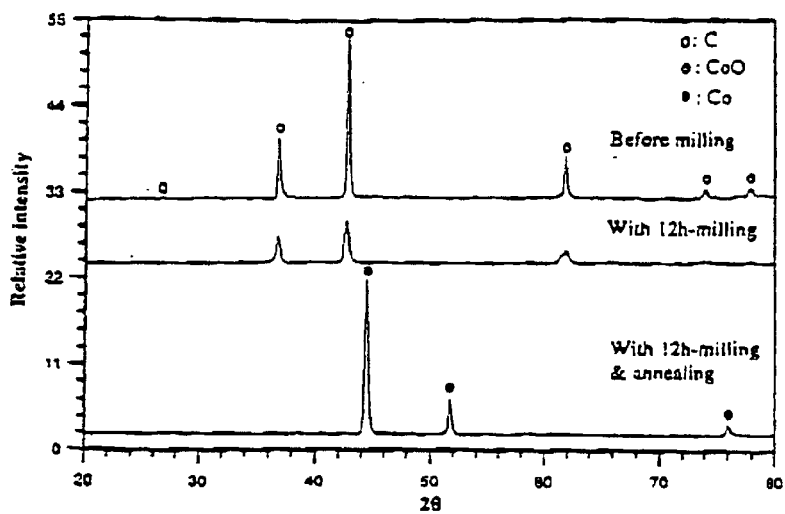
FIG. 5 shows changes in the XRD pattern of CoO and graphite powder mixtures before milling, after milling, and after milling and carbothermic reduction at 800° C. under argon for 2 hours.
Figure 6:
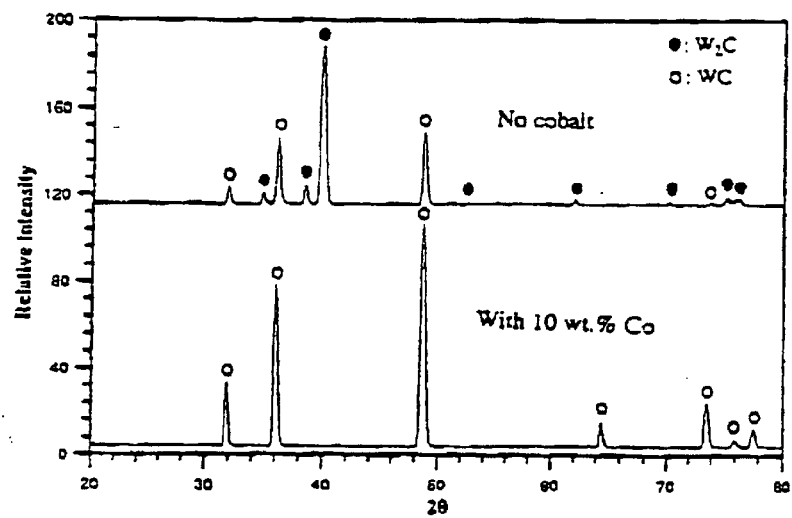
FIG. 6 shows the changes in XRD patterns of $WO_3$ and graphite powder with and without CoO, each annealed at 800° C. for 2 hours.

In this embodiment, the metal binder in the cermet system can be added to the precursor powder mixture in the form of either the metal oxide (e.g., CoO) or elemental metal (e.g., Co) powder. With respect to cobalt, the oxide is preferred because it is more brittle than the pure metal. Uniform mixing of $WO_3$, C, and CoO more readily achieved, which leads in turn to a uniform distribution of Co in the final product. CoO can be carbothermically reduced to elemental Co easily when the CoO and C mixture is heated to about 800° C., as shown in FIG. 5. An important advantage of adding CoO (or Co) to the powder mixture before milling is that Co is one of the best catalysts for the decomposition of carbon monoxide (CO). Decomposition of CO in turn provides active carbon for the reduction of the various oxides and carburizes elemental W and many intermediate compounds (e.g., $W_2C$, $Co_6W_6C$ and $Co_3W_3C$) that may appear in this inventive process to form WC. The effect of Co is shown clearly in FIG. 6 wherein WC formation with and without Co is compared.

Similarly an elemental powder could also be used as the starting material in the formation of the carbide (e.g., tungsten could be used to instead of, or in combination with, tungsten oxide). With respect to tungsten, tungsten oxide is preferable because tungsten is more expensive than tungsten oxide, and because shorter milling times are required for tungsten oxide.

The overall reactions for synthesizing WC—Co cermets can be expressed as

$$WO_3 + 4C = WC + 3CO \qquad (1)$$

$$CoO + C = Co + CO \qquad (2)$$

Tungsten cobalt carbide powders produced by this method are submicron-sized (0.2 to 0.4 microns) with internal nanograins (10 to 40 nanometers in diameter). The nanostructured WC—Co powders produced in accordance with this method have furthermore been shown to produce components with much better wear resistance than those made of conventional WC—Co powders.

The synthesized powders may also include other phases such as TiC, VC, TaC, NbC, and the like, to produce complex grade cermets such as WC—TiC—Co, WC—TaC—Co, WC—VC—Co and WC—TiC—TaC—NbC—Co. Either the desired carbide(s) (e.g., TiC, TaC, VC, and NbC powders) or their corresponding oxides (e.g., $TiO_2$, $Ta_2O_5$, $V_2O_5$, $V_2O_3$, $Nb_2O_5$, $Nb_2O_3$ and so on) can be added to the $WO_3$, CoO, and C mixture before the high energy ball milling. The temperature used in the annealing may also be adjusted, depending upon the nature of additives. Nanostructured cermets with metallic binders other than Co can also be formed. For example, to manufacture seal rings that are subjected to corrosive environments, the binder can be changed to a nickel-chromium alloy. This can be accomplished by replacing CoO with NiO and $Cr_2O_3$ and adjusting the amount of carbon accordingly.

In order to provide better understanding of the present invention, examples are set forth below which are illustrative only. Those skilled in the art will recognize that there are numerous modifications and variations, and that the present invention is not limited to such examples.

EXAMPLES

Example 1

Synthesis of Nanocrystalline TiC

Anatase-$TiO_2$ powder (99.95% pure, mean diameter 0.3 μm, obtained from J. T. Baker Chemical Co., Phillipsburg, N.J.) is mixed with graphite powder (99.9% pure, mean diameter less than 10 μm, obtained from Johnson Matthey, Ward Hill, Mass.) and tungsten carbide balls (4.76 mm diameter) to prepare a powder and ball mixture having a molar ratio of carbon:oxide of 4:1, and the charge ratio of the ball:powder weight of 60:1. This powder and ball mixture is loaded into the milling canister of modified Szegvari attritor in accordance with the procedure set forth in "Synthesis of Nanocrystalline SiC at Ambient Temperature Through High Energy Reaction Milling", Z.-G. Yang and L. L. Shaw, Nanostructured Materials, Vol. 7, pp. 873–886 (1996), incorporated herein by reference in its entirety. Before milling, the charged canister is evacuated to $10^{-2}$ torr, flushed with argon, evacuated, and then back-filled with argon having a of purity 99.95%, at a pressure of about 1.5 atm. The milling canister is then cooled using circulation water with a flow rate of about 770 mL/min, and this cooling is maintained throughout the process. The temperature of the canister is monitored using an E-type thermocouple attached to the bottom of the canister. The mixture is then milled using a milling speed of 600 RPM.

After milling for 24 hours, samples of the as-milled powder mixture are analyzed via X-ray diffraction (XRD), transmission electron microscopy (TEM), scanning election microscopy (SEM), and surface area analysis. The XRD and TEM examination suggest that the graphite powder has been transformed to an amorphous phase, and that while some of the anatase-$TiO_2$ is amorphous, some also transforms to other polymorphic structures such as ruile- and srilankite-$TiO_2$, and some retains anatase crystal structure, but is nanostructured The as-milled powder is cold-compacted into a disc having a height of 2 mm and diameter of 15 mm. The disc is heated to 1300° C. at a heating rate of about 60° C./min, and then held at the designated temperature under flowing argon gas having a of purity 99.95% for 1 hour. The disc is then furnace-cooled to room temperature and removed from the furnace.

X-ray diffraction analysis of the annealed specimen shows that nanocrystalline TiC was formed from the milled powder mixture with no detectable $TiO_2$ or graphite. The crystallite size, as determined from the line broadening of the XRD spectrum, is 26 nm, while the particle size, as estimated from SEM, ranges from about 50–200 nm.

A comparative experiment shows that no TiC was formed if the $TiO_2$ and graphite powders are simply mixed and then annealed in the absence of a high-energy milling treatment. These data clearly indicate that the formation of TiC through the carbothermic reduction of $TiO_2$ is greatly enhanced by high energy milling. Furthermore, the powder particles are synthesized on submicron scale with nanostructures.

Example 2

Synthesis of Nanocrystalline SiC $SiO_2$ (99.5% purity, mean diameter 2 μm, obtained from Johnson Matthey, Ward Hill, Mass.) is mixed with graphite powder (99.9% purity, mean diameter less than 10 μm) and WC balls (4.76 mm diameter) to prepare a powder and ball mixture having carbon:oxide molar ratio of 4:1 and ball::powder charge of 60:1. This powder and ball mixture is milled using the conditions described in Example 1 above. After milling for 1.5 hours, samples of the powder mixture are analyzed via XRD, TEM, SEM and surface area analysis. The XRD and TEM analysis indicate that some graphite powder is transformed to an amorphous phase, and that while some of the $SiO_2$ becomes amorphous, some remains crystalline.

The milled powder is loosely placed into an alumina boat and heated to 1500° C. at a heating rate of about 60° C./min, and held at this temperature under an argon atmosphere for 1 hour. The annealed carbide is furnace cooled to room temperature and then removed from the furnace.

X-ray diffraction analysis of the annealed specimen shows that all silica has been converted to nanocrystalline β-SiC. The crystallite size as determined from the line broadening of XRD spectrum is 19 nm, while the mean particle size as estimated from SEM is 290 nm. A comparative experiment under the same conditions but without the high energy milling step shows that no SiC is formed from the $SiO_2$ and graphite powder mixtures without the high energy milling.

Example 3

Synthesis of Nanostructured WC-18% Co

Tungsten trioxide ($WO_3$) powder of 99.8% purity (10–20 micrometer) was mixed with graphite (C) powder of 99.0% purity (~100 mesh) and cobalt oxide (CoO) powder of 95% purity (~300 mesh). The molar ratio of $WO_3$:C:CoO was 1:5.24:0.677, which leads to a final product with a WC—Co composition comprising 18 wt. % Co. This powder mixture was mixed with tungsten carbide (WC) balls to prepare a powder and ball mixture with a charge ration of 60:1. The powder and ball mixture was loaded into the milling canister of a modified Szegvari attritor. The charged canister was evacuated up to $10^{-2}$ torr, flushed with argon, followed by evacuation, and finally back filled with argon of purity 99.95% at a pressure of 1.5 atm before the onset of milling. The canister was cooled with circulating water at a flow rate of about 770 ml/min throughout the process and the temperature of the canister was monitored using an E-type thermocouple attached to the bottom of the canister. A milling speed of 600 RPM (the diameter of the canister=88 mm) was employed.

After milling for 12 hours, the milled powder was taken out from the canister in air and divided into two samples: one for XRD, SEM, TEM, and surface area analysis, and the other for carbothermic reduction. For carbothermic reduction, the milled powder was loaded loosely in a furnace, heated to 900° C. with a heating rate of 500° C./hours, held in Ar for 0.5 hours, then in CO for 1.5 hours, and finally furnace cooled to room temperature and removed from the furnace.

Figure 7:
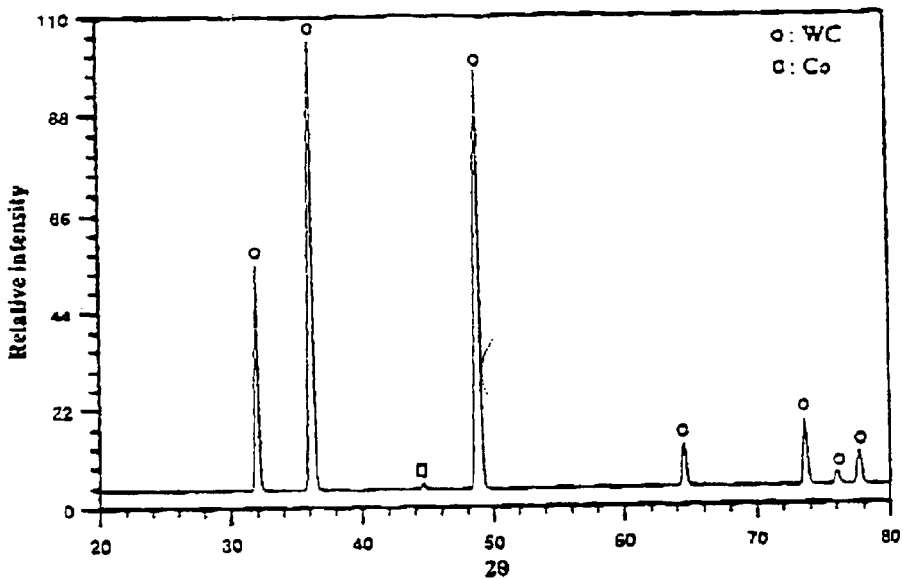
FIG. 7 shows the XRD patterns of a $WO_3$—CoO—C powder mixture milled for 12 hours at ambient temperature and then annealed at 900° C. under argon for 0.5 hours and then under CO for 1.5 hours, illustrating the formation of nanostructured WC—Co cermets.

XRD analysis indicated that the crystallite size of $WO_3$ after milling for 12 hours was 20 nm. After carbothermic reduction, the milled powder was transformed to WC and Co with no residual $WO_3$, CoO and C (FIG. 7). Based on the peak broadening of XRD patterns, the grain size of the synthesized WC was estimated to be 33 nm. The grain size of Co was not estimated due to its low reflection intensity. The mean particle size of the WC—Co cermet was 0.3 microns. Thus, the WC-18 wt. % Co cermet synthesized was submicron-sized particles with internal nanograins.

Example 4

Synthesis of Nanostructured WC-10 wt. % Co

The overall procedure and raw materials used in this example was the same as those in Example 3 except that the molar ratio of $WO_3$:C:CoO was 1:5.24:0.347. The crystallite size of $WO_3$ after milling for 12 hours was found to be about 20 nm, similar to that found in Example 3. The grain size of the synthesized WC was estimated to be 28 nm, slightly lower than that of the WC obtained in Example 3. Again, all $WO_3$, CoO and C were converted to WC and Co after the carbothermic reduction treatment.

Example 5

Synthesis of Nanostructured WC-10 wt. % Co

The overall procedure and raw materials used in this example was the same as those in Example 4 except that carbothermic reduction was carried out at 1000° C. The grain size of the synthesized WC was estimated to be 33 nm, slightly higher than the grain size of WC when carbothermic reduction was carried out at 900° C. (Example 4).

Example 6

Synthesis of Nanostructured WC-10 wt. % Co

The overall procedure and raw materials used in this example was the same as those in Example 4, except that the powder mixture was only milled for 3 hours at ambient temperature. The crystallite size of $WO_3$ after milling for 3 hours was found to be 23 nm, nearly identical to the size of $WO_3$ milled for 12 hours. All $WO_3$, CoO and C were converted to WC and Co after the carbothermic reduction treatment. The grain size of the synthesized WC was estimated to be 48 nm.

Example 7

Wet High Energy Ball Milling

Tungsten trioxide ($WO_3$) powder of purity 99.8% (10–20 micrometer) was mixed with graphite (C) powder of purity 99.0% (−100 mesh) and cobalt oxide (CoO) powder of purity 99% (−300 mesh). The molar ratio of $WO_3$:C:CoO was 1:2.365:0.73, which would lead to a final product with a composition of WC-18 wt. % Co. 150 ml of heptane liquid was added to the foregoing powder mixture which was subsequently mixed with tungsten carbide (WC) balls to prepare a powder and ball mixture and a charge ratio of 60:1. The powder, ball and heptane mixture was loaded into the milling canister of a modified Szegvari attritor the details of which can be found in our previous publication. The charged canister was evacuated up to $10^{-2}$ torr, flushed with argon, followed by evactuation, and finally back filled with argon of purity 99.95% at a pressure of 1.5 atm before the onset of milling. The canister was cooled with circulating water at a flow rate of about 770 ml/min throughout the process and the temperature of the canister was monitored using an E-type thermocouple attached to the bottom of the canister. A milling speed of 600 RPM (the diameter of the canister=88 mm) was employed.

After milling for 6 hours, the milled powder was taken out from the canister in air and was loaded loosely in a furnace, heated to 650° C. with a heating rate of 500° C./h, held in an atmosphere with 0.5 atm of $H_2$ and 0.5 atm of Ar for 2 hours, then at 800° C. in a CO atmosphere for 1 hour, and finally furnace cooled to room temperature and removed from the furnace.

Figure 8:
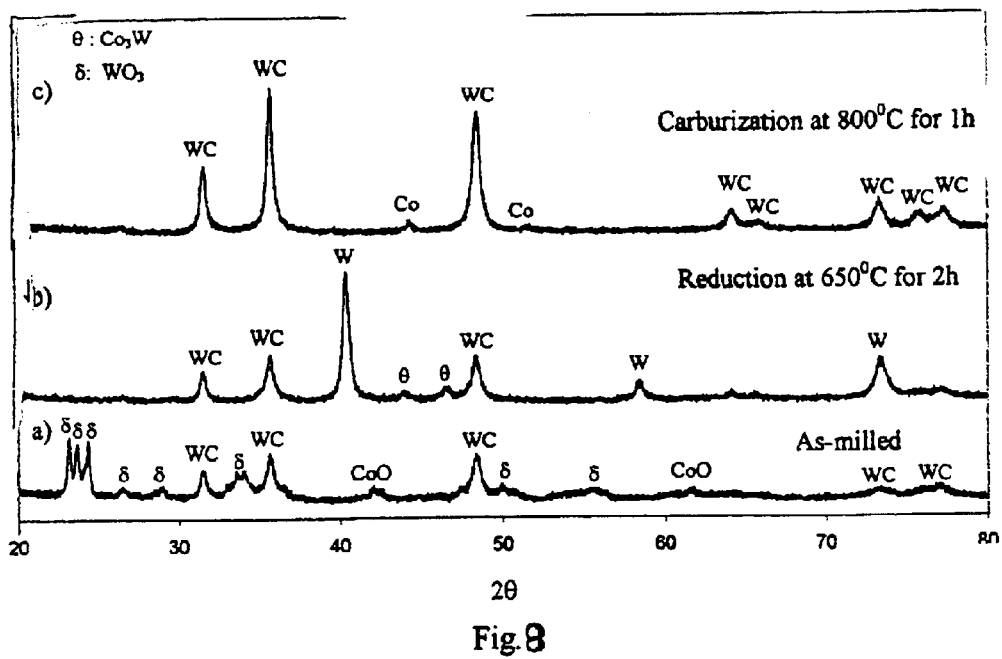
FIG. 8 shows the XRD patterns of tungsten cobalt carbide powders milled with and without a liquid.

XRD analysis indicated that the crystallite size of $WO_3$ after milling for 6 hours was larger than that of $WO_3$ milled without the addition of heptane. Furthermore, substantial wear of WC balls was observed as shown by the curve (a) in FIG. 8. After the carbothermic reduction at 800° C. the crystallite size of WC was found to be about 8 nm. Thus nanostructured WC/Co can be produced with the addition of heptane during high energy milling although contamination due to wear of balls increases and the efficiency of high energy milling decreases in comparison with high energy milling without the addition of heptane.

The present process is economical, and provides a replacement for the current carbothermic reduction and spray conversion processes to manufacture carbide cermet powders. The process further allows the manufacture of nanostructured WC—Co cermets with lower costs and better performance. Therefore, the inventive process can have an immediate and significant impact on several industries that use WC—Co cermets.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for the synthesis of carbide cermet powders, comprising high-energy ball milling at a speed greater than 300 rotations per minute a mixture of carbide cermet precursor powders comprising at least two different metals and a carbon source to form a milled powder; and annealing the milled powder to form a carbide cermet powder wherein the carbide cermet precursor powders comprise a metal oxide.

2. The method of claim 1, wherein the carbide cermet precursor powders comprises at least one of silicon, titanium, thorium, hafnium, vanadium, chromium, tungsten, nickel, cobalt, iron, tantalum, niobium, or zirconium.

3. The method of claim 1, wherein the carbon source is graphite, coal, thermal black, acetylene black, coke or a mixture thereof.

4. The method of claim 1, wherein the high-energy ball milling is performed using an attritor.

5. The method of claim 1, wherein annealing is carried out under a flow of inert gas.

6. The method of claim 1, wherein the carbide cermet precursor powders are ball milled in the presence of a liquid.

7. The method of claim 1, comprising annealing is at a temperature in the range from about 500° C. to about 1500° C.

8. The method of claim 1, wherein the carbide cermet powder comprises nanostructured particles.

9. A method for the synthesis of micron- or submicron-sized, carbide cermet powders, comprising high energy ball milling at a speed greater than 300 rotations per minute a mixture of a carbon source, at least one of a precursor of SiC, TiC, VC, HfC, ThC$_2$, ThC, Cr$_3$C$_2$ WC, W$_2$C, ZrC, TaC, Ta$_2$C, or NbC, and a metal source to form a milled powder; and annealing the milled powder to form micron- or submicron-sized, carbide cermet powders wherein the precursor is a metal oxide.

10. The method of claim 9, wherein the precursor of SiC, TiC, VC, HfC, ThC$_2$, ThC, Cr$_3$C$_2$ WC, W$_2$C, ZrC, TaC, Ta$_2$C, or NbC is the corresponding oxide or element.

11. The method of claim 9, wherein the metal is cobalt, nickel, iron, chromium, or a nickel-chromium alloy.

12. The method of claim 9, wherein the carbon precursor is graphite, coal, thermal black, acetylene black, coke, or a combination thereof.

13. The method of claim 9, wherein annealing is carried out under a flow of inert gas and at a temperature in the range from about 500° C. to about 1500° C.

14. The method of claim 9, wherein the carbide cermet powder comprises nanostructured particles.

15. The method of claim 9, wherein the carbon source and cermet precursor powders are ball milled in the presence of a liquid.

16. A method for the synthesis of micron- or submicron-sized tungsten carbide powders, comprising high-energy ball milling at a speed greater than 300 rotations per minute a mixture of a tungsten oxide, a carbon source, and a cobalt source to form a milled powder; and annealing the milled powder to form micron- or submicron-sized tungsten carbide cobalt powders.

17. The method of claim 16, wherein the tungsten oxide is tungsten trioxide and the cobalt source is cobalt or cobalt oxide.

18. The method of claim 16, wherein the carbon precursor is graphite, coal, thermal black, acetylene black, coke, or a combination thereof.

19. The method of claim 16, wherein annealing is carried out under a flow of inert gas, at a temperature in the range from about 700 to about 1300° C.

20. The method of claim 16, wherein the tungsten cobalt carbide powder further comprises one or more of Ni, Cr, Ni—Cr alloy, TiC, TaC, NbC, VC, or Cr$_3$C$_2$.

21. The method of claim 16, wherein the tungsten cobalt carbide powder is nanostructured.

22. The method of claim 16, wherein the carbon source, tungsten oxide, and cobalt source powders are ball milled in the presence of a liquid.

23. A method for the synthesis of micron- or submicron-sized, nanostructured tungsten carbide cobalt powders, comprising high-energy ball milling at a speed greater than 300 rotations per minute a mixture of a tungsten oxide, a carbon source, and a cobalt precursor to form an as-milled powder; and annealing the as-milled powder at a temperature from about 700° C. to about 1300° C., thereby forming micron- or submicron-sized, tungsten carbide cobalt powders comprising nanostructured particles.

24. The method of claim 23, wherein the carbon source is graphite, coal, thermal black, acetylene black, coke, or a mixture thereof.

25. The method of claim 23, wherein annealing is carried out under a flow of inert gas.

26. The method of claim 23, wherein the nanostructured tungsten cobalt carbide powder further comprises one member of the group consisting of TiC, TaC, NbC, VC, Ni, Fe, and Cr$_3$C$_2$.

27. The method of claim 23, wherein the carbon source, tungsten oxide, and cobalt precursor powders are ball milled in the presence of a liquid.

* * * * *